H. F. PENDLETON.
METHOD OF VULCANIZING RUBBER.
APPLICATION FILED NOV. 15, 1907.

956,409.

Patented Apr. 26, 1910.

Witnesses:

Inventor:
Harry Fillmore Pendleton,
by Frederick J. Allen,
Attorney.

UNITED STATES PATENT OFFICE.

HARRY FILLMORE PENDLETON, OF BROOKLYN, NEW YORK, ASSIGNOR TO THE AMERICAN WRINGER COMPANY, A CORPORATION OF RHODE ISLAND.

METHOD OF VULCANIZING RUBBER.

956,409.   Specification of Letters Patent.   Patented Apr. 26, 1910.

Application filed November 15, 1907. Serial No. 402,233.

*To all whom it may concern:*

Be it known that I, HARRY FILLMORE PENDLETON, a citizen of the United States, residing at Brooklyn, Kings county, State of New York, have invented certain new and useful Improvements in Methods of Vulcanizing Rubber, of which the following is a description.

The object of my invention is to vulcanize a mass of rubber upon a core of rope so that the expansion of the rubber in the vulcanizing process will force it into the depressions of the rope and cause it to grip it firmly. I accomplish this result by placing the rubber to be vulcanized upon the rope core and submitting it to the vulcanizing heat while inclosed in a tight mold which is provided with egress channels for the rope. These channels also serve to vent the mold. The resultant product shows that the rubber is forced into the most minute depressions upon the surface of the rope, and can only be dislodged by destroying it. Such articles are capable of wide employment as rollers or bumpers, or wherever their qualities of flexibility, elasticity, and tensile strength may be required.

Figure 1:
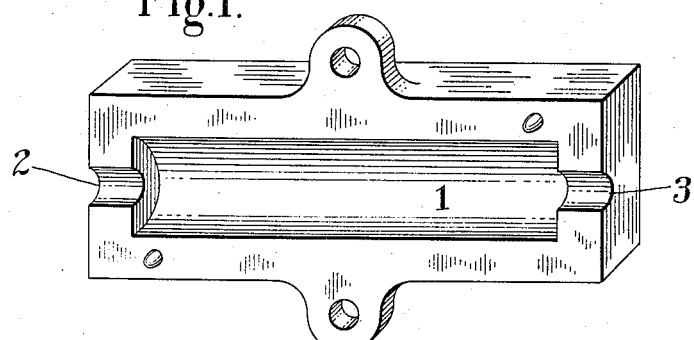
Figure 2:
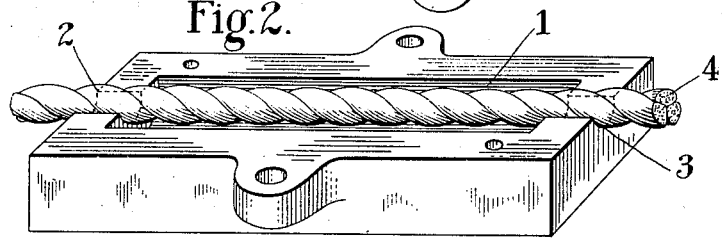
Figure 3:
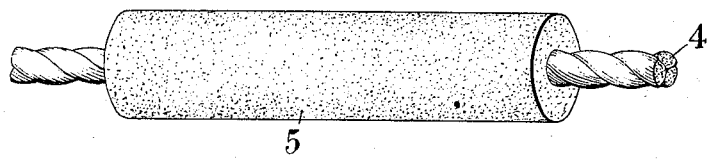

In the drawings, Figures 1 and 2 show the two parts of the mold, and Fig. 3 a rope covered as above described.

1 is the cavity in the mold.

2 and 3 are the egress channels occupied by the rope 4, and 5 is a cylinder of rubber upon a core of rope 4.

The materials employed are the usual ones for this purpose and the heat is applied in the usual manner.

I claim—

1. The process which consists in providing a fibrous rope core, positioning it in a quantity of material to be vulcanized thereupon, applying vulcanizing heat and pressure, and thereby causing said material to be forced radially into the interstices of the rope.

2. The process which consists in providing a fibrous rope core made up of twisted strands, and a quantity of material to be vulcanized thereupon, applying vulcanizing heat, and causing said material to be forced radially into the interstices of the rope.

3. The process which consists in providing an elongated porous core, and a quantity of material to be vulcanized thereupon, applying vulcanizing heat, and causing said material to be forced into the said core from all sides in lines parallel to a cross-sectional plane of the core.

4. The process which consists in providing, within a closed mold having egress passages, a fibrous rope core adapted to fit said passages and a surrounding quantity of material to be vulcanized, so that the ends of the core extend within said passages, and then applying vulcanizing heat.

5. The process which consists in providing, within a closed mold having egress passages, a fibrous rope core made up of twisted strands, adapted to fit said passages, and a surrounding quantity of material to be vulcanized, so that the ends of the core extend within said passages, and then applying vulcanizing heat.

6. The process which consists in providing, within a closed mold having egress passages, a porous core adapted to fit said passages and a surrounding quantity of material to be vulcanized, so that the ends of the core extend within said passages, and then applying vulcanizing heat.

7. The process which consists in providing, within a closed mold having egress passages, a flexible porous core adapted to fit said passages and a surrounding quantity of material to be vulcanized, so that the ends of the core extend within said passages, and then applying vulcanizing heat.

HARRY FILLMORE PENDLETON.

Witnesses:
A. G. BEARDSLEY, Jr.,
FREDERICK I. ALLEN.